(12) United States Patent
Kuo et al.

(10) Patent No.: US 7,934,225 B2
(45) Date of Patent: Apr. 26, 2011

(54) SLOT-IN DISK DRIVE DEVICE AND METHOD

(75) Inventors: Yao-Ting Kuo, Taoyuan (TW); Jen-Chen Wu, Taoyuan (TW); Yao-Jia Chiou, Taoyuan (TW); Yao-Ching Tsai, Taoyuan (TW)

(73) Assignee: Quanta Storage Inc. (TW)

( * ) Notice: Subject to any disclaimer, the term of this patent is extended or adjusted under 35 U.S.C. 154(b) by 929 days.

(21) Appl. No.: 11/889,095

(22) Filed: Aug. 9, 2007

(65) Prior Publication Data

US 2008/0052733 A1 Feb. 28, 2008

(30) Foreign Application Priority Data

Aug. 24, 2006 (TW) .............................. 95131271 A

(51) Int. Cl.
*G11B 17/04* (2006.01)
(52) U.S. Cl. ..................................................... 720/645
(58) Field of Classification Search .................. None
See application file for complete search history.

(56) References Cited

U.S. PATENT DOCUMENTS

| | | | | |
|---|---|---|---|---|
| 4,979,160 A * | 12/1990 | Araki | ............................. | 720/621 |
| 6,983,471 B2 * | 1/2006 | Suzuki | ......................... | 720/620 |
| 7,007,285 B2 * | 2/2006 | Suzuki | ......................... | 720/621 |
| 7,353,522 B2 * | 4/2008 | Suzuki | ......................... | 720/621 |
| 7,487,520 B2 * | 2/2009 | Omori et al. | .................. | 720/706 |
| 7,576,946 B2 * | 8/2009 | Fujisawa | .................... | 360/99.06 |
| 7,594,240 B2 * | 9/2009 | Omori et al. | .................. | 720/620 |
| 7,805,737 B2 * | 9/2010 | Yamada et al. | ............... | 720/622 |

\* cited by examiner

*Primary Examiner* — Mark Blouin
(74) *Attorney, Agent, or Firm* — Bacon & Thomas, PLLC

(57) ABSTRACT

A slot-in disk drive device and a method thereof. The device includes a drive unit for providing power to move a slider. A loading unit moving with the slider drives a loading stick to push a disc into the device. The slider has a sliding slot. An ejecting unit with a bar-linkage mechanism has one end driven by the sliding slot, and the other end for rotating an ejecting bar to guide or push the disc out. A receiving unit has a receiving bar for guiding the disc, and has a positioning bar disposed between the loading unit and the ejecting unit. A sensing unit includes a plurality of sensing switches respectively disposed near the moving paths of the receiving bar, the ejecting unit and the positioning bar. The drive unit is enabled to load the disk is determined according to the order of actuating the switches.

22 Claims, 14 Drawing Sheets

SLOT-IN DISK DRIVE DEVICE AND METHOD

This application claims the benefit of Taiwan application Serial No. 95131271, filed Aug. 24, 2006, the subject matter of which is incorporated herein by reference.

BACKGROUND OF THE INVENTION

1. Field of the Invention

The invention relates in general to a slot-in optical drive, and more particularly to an apparatus and a method of driving and guiding different sizes of discs to be loaded and ejected in a slot-in disk drive device.

2. Description of the Related Art

Typical disk drive devices may be mainly classified into a tray type disk drive device and a slot-in disk drive device. The tray type disk drive device has a tray for supporting a disc, and the tray is pushed into or slides out of the disk drive device so that the disc reaches a specific position or is ejected. The disc only has to be directly inserted into an inlet of the slot-in disk drive device, and the loading/ejecting mechanism can automatically suck the disc in and guide the disc to the specific position in a convenient manner. In addition, no tray is needed such that the device can be thinned more easily.

However, different sizes of discs cannot be embedded with a spindle motor for rotating the disc correctly until the disc reach a playing position in the disk drive device without error, or otherwise the optical disc is jammed in the disk drive device. Thus, the device tends to have a fault, or even the disc and the disk drive device tend to be damaged. Multiple sliding plates, guiding rods and bar-linkage mechanisms are utilized to guide the different sizes of discs for positioning and loading/ejecting in prior arts. However, the guiding rod and the bar-linkage mechanism have to successively guide the disc to be aligned with the spindle motor, and the loading/ejecting mechanism is too complicated. Also, the disc cannot be always kept horizontal via the peripheral point contacting to guide the disc. Thus, when the foreign object or disc is being loaded, other switches corresponding to other sizes of discs may be touched and the determination error of the disc size may occur to cause the malfunction of the transmission mechanism and thus to cause the disk drive device to breakdown. Thus, the conventional apparatus and method of the slot-in disk drive device for loading and ejecting the disc still have problems to be solved.

The invention will become apparent from the following detailed description of the preferred but non-limiting embodiments. The following description is made with reference to the accompanying drawings.

SUMMARY OF THE INVENTION

The invention is directed to a slot-in disk drive device and a method thereof, wherein sizes of loaded discs are mechanically determined according to different moving properties of the discs, and the determination is further made according to the order of actuating sensing units so that the reliability of the operation of the optical drive is enhanced.

The invention is also directed to a disk drive device and a method thereof, wherein a simple link transmission mechanism is adopted to drive an ejecting bar to eject the disc so that the structure of the disk drive device is simplified and the cost thereof is reduced.

The invention is further directed to a disk drive device and a method thereof, wherein a guiding slot is extended to cause a loading stick to move alongside when the disc is being ejected so that the disc may be ejected more smoothly.

According to a first aspect of the present invention, a slot-in disk drive device is provided. The slot-in disk drive device includes a drive unit, a loading unit, an ejecting unit, a receiving unit and a sensing unit. The drive unit provides power to move a slider formed with a sliding slot. The loading unit moves with the slider and provides a pushing force for a loading stick to push a disc into the device. The ejecting unit is a bar-linkage mechanism and has one end driven by the sliding slot and the other end rotated by an ejecting bar to guide the disc or to push the disc out. The receiving unit has a receiving bar and a positioning bar, and the receiving bar is actuated by the loading unit to guide the disc. The positioning bar is disposed between the loading unit and the ejecting unit. The sensing unit includes a plurality of sensing switches respectively disposed near moving paths of the receiving bar, the ejecting unit and the positioning bar, wherein the drive unit is enabled to load the disc according to the order of actuating the sensing switches.

According to a second aspect of the present invention, a slot-in optical disk drive method is provided. The method includes the following steps. First, it is detected whether an ejecting unit actuates a first sensing switch. If not, a disc is continuously loaded. If yes, it is further detected whether a receiving bar actuates a second sensing switch. If yes, it is determined that a large-sized disc is loaded and then it is further detected whether a positioning bar actuates a third sensing switch. If yes, it represents that the large-sized disc has reached a sufficient depth and a driving motor is enabled to load the disc in. If it is detected that the receiving bar does not actuate the second sensing switch, it is determined that a small-sized disc is loaded and has reached a sufficient depth, and the driving motor is immediately enabled to load the disc in. After the driving motor is enabled, it is detected whether a slider actuates a fourth sensing switch. If yes, the driving motor is disabled and the disc loading is completed, or otherwise the detection is continuously made.

The invention will become apparent from the following detailed description of the preferred but non-limiting embodiments. The following description is made with reference to the accompanying drawings.

DETAILED DESCRIPTION OF THE INVENTION

Figure 1:
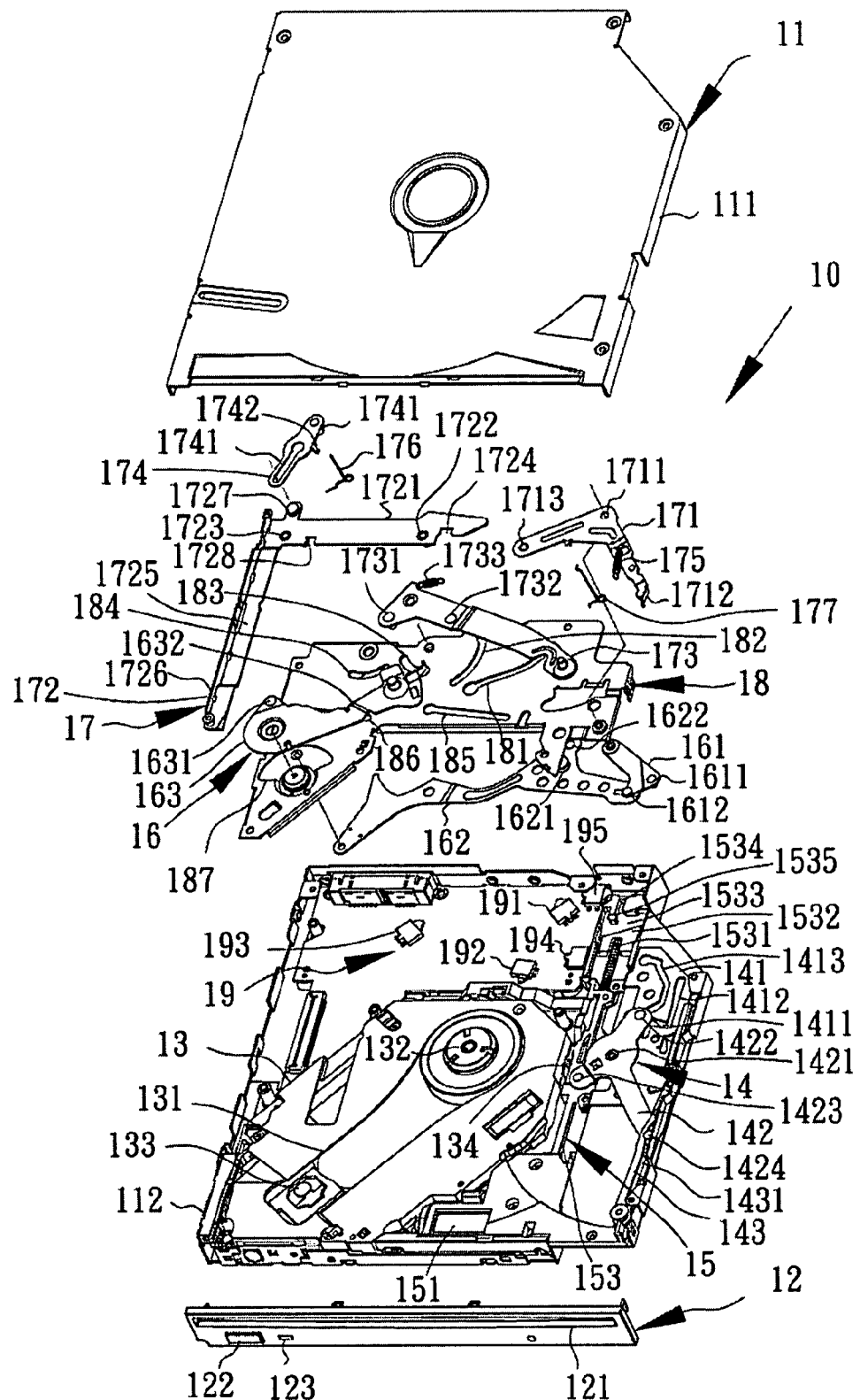
FIG. 1 is an exploded view showing components of a slot-in disk drive device according to the invention.

FIG. 1 is an exploded view showing components of a slot-in disk drive device according to the invention. Referring to FIG. 1, a slot-in disk drive device 10 of the invention includes a casing 11, a panel 12, a traverse 13, a loading unit 14, a drive unit 15, an ejecting unit 16, a receiving unit 17, a substrate 18 and a sensing unit 19. The ejecting unit 16 and the receiving unit 17 actuate the sensing unit 19 to sense a disc D (see FIG. 4) inserted into the disk drive device 10, and enable the drive unit 15 to move the loading unit 14 to push the disc D into the disk drive device 10, and further move the receiving unit 17 to guide the disc D to a predetermined position. Then, the traverse 13 rises to embed with the disc, rotates the disc D and then plays the disc or ejects the disc.

The casing 11 is composed of an upper case 111 and a lower case 112, which cover a hollow space for accommodating a disc drive mechanism for driving the disc D into and out of the casing 11. The panel 12 is disposed at a front end of the casing 11, and is formed with a long-slot-like disc inlet/outlet 121. An ejecting button 122 is disposed on the panel 12 and below the inlet/outlet 121 and is to be pressed so that the disc D is ejected. An indicator 123 is disposed on the panel 12 and near the ejecting button 122 to indicate an operation condition of the disk drive device 10.

The traverse 13 tilts to a corner from a center of the disk drive device 10 and is disposed near a front end of the lower case 112. A shaft of the traverse 13 is formed with a longitudinal fixed slot 131. A spindle motor 132 for rotating the disc D is disposed at one end of the fixed slot 131 near the center of the disk drive device 10. A pickup head 133 slides along the other portion of the fixed slot 131 to read data on the disc D or write the data to the disc D. A projecting sliding pin 134 is disposed on a lateral side of the spindle motor 132 near the traverse 13.

Figure 2:
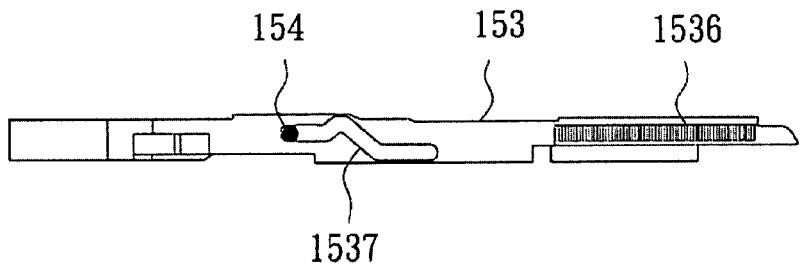
FIG. 2 shows a side surface of a slider of the invention.

The drive unit 15 is disposed on a lateral side of the traverse 13 to provide a power source. A driving motor 151 disposed on the front end of the disk drive device 10 rotates a gear set 152 (see FIG. 3) to drive a slider 153, extending to a rear end, to slide back and forth. An ejecting spring 1531 is fixed to the slider 153. The other end of the ejecting spring 1531 pushes a slidable ejecting slider 1532. The ejecting slider 1532 and the rear-end wall of the slider 153 form a first sliding slot 1533, which extends backward to form a second sliding slot 1534 and a third sliding slot 1535 that connect the first sliding slot 1533. As shown in FIG. 2, a rack 1536 driven by the gear set 152 is disposed at the front end of the side surface of the slider 153, and a lifting slot 1537 is formed near middle of the side surface of the slider 153 so that the sliding pin 134 of the traverse 13 can be embedded and slide therein and the sliding pin 134 slides back and forth with the movement of the slider 153 to move up and down relative to the lifting slot 1537.

Figure 3:
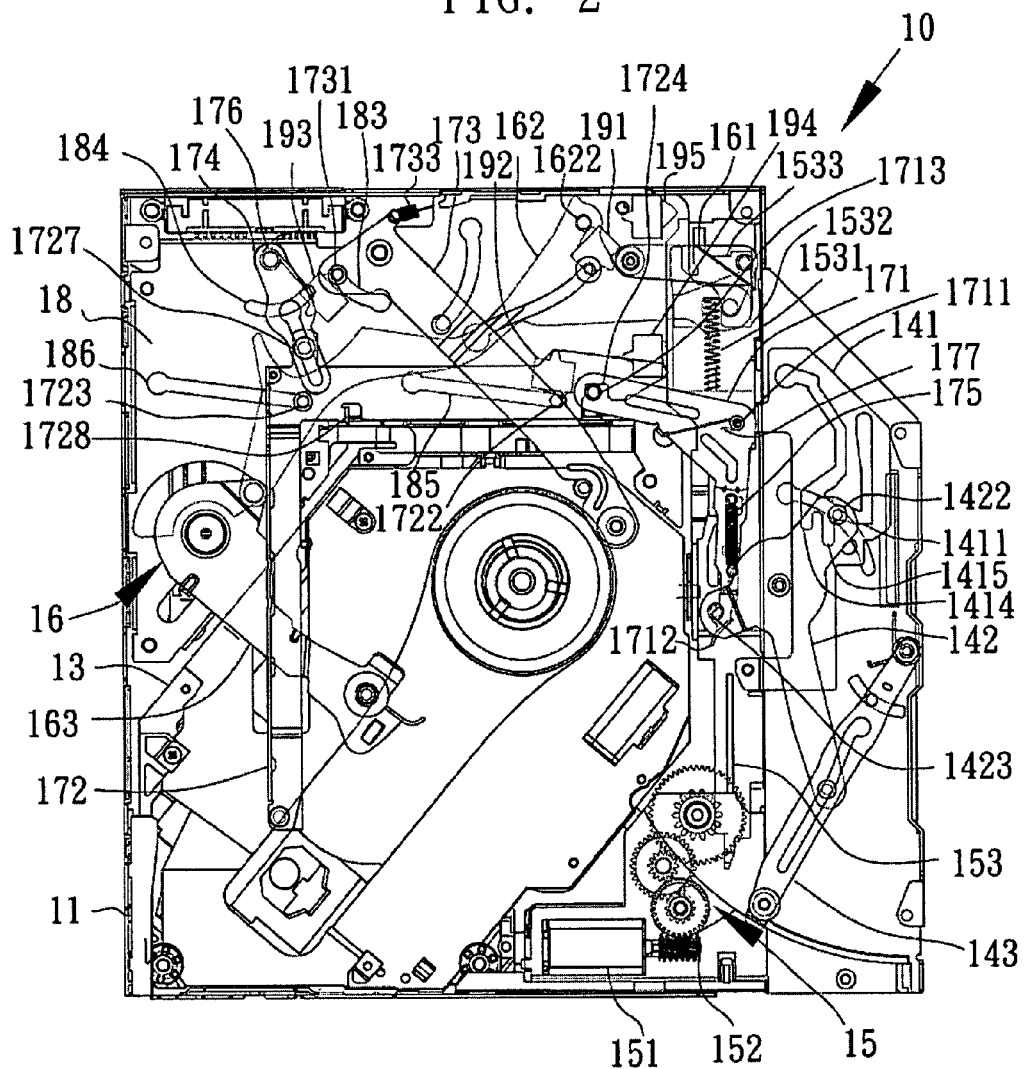
FIG. 3 is a top view showing a slot-in disk drive device of the invention in an initial state.

The loading unit 14 is disposed on the other side of the drive unit 15 opposite to the traverse 13, and mainly includes a sliding plate 141, a transmission bar 142 and a loading stick 143. One side of the sliding plate 141 is fixed to the slider 153 and the sliding plate 141 slides along the lower case 112 with the movement of the slider 153. A first guiding slot 1411 is formed on the sliding plate 141 and extends backward to form a second guiding slot 1412 and a third guiding slot 1413, which connects the first guiding slot 1411, and additionally extends forward to form a shorter fourth guiding slot 1414 and a shorter fifth guiding slot 1415, as shown in FIG. 3. The transmission bar 142 is a Y-shaped bar having a center 1421 fixed to the lower case 112. The Y-shaped bar has a first end fixed to a first guide pin 1422, which projects downward and is embedded into the first guiding slot 1411, a second end fixed to a second guide pin 1423, which projects downward and is suspended above the slider 153, and a third end fixed to a third guide pin 1424 projecting downward. One end of the loading stick 143 is fixed to a lateral side of the lower case 112, and a longitudinal slot 1431 is formed along the axial direction. The third guide pin 1424 is embedded into the longitudinal slot 1431 and may slide therein to rotate the loading stick 143.

In addition, the sensing unit 19 is composed of a first sensing switch 191, a second sensing switch 192, a third sensing switch 193, a fourth sensing switch 194 and a fifth sensing switch 195. Each of the sensing switches may be a limit switch. The sensing unit 19 is dispersed on a back side of the lower case 112. The fourth sensing switch 194 and the fifth sensing switch 195 are attached to the rear lateral side of the slider 153 to respectively sensing end points of disc loading and ejecting so as to cut off the power source of the drive unit 15. The first sensing switch 191, the second sensing switch 192 and the third sensing switch 193 work in conjunction with the ejecting unit 16 and the receiving unit 17. The size of the disc D that is pushed into the device is determined according to the order of actuating the switches, and the details will be described in the following.

The substrate 18 is spreaded over a rear upper side of the disk drive device 10 to cover the sensing unit 19 and the rear side of the slider 153. The substrate 18 is separately formed with a first arc slot 181, a second arc slot 182, a third arc slot 183, a fourth arc slot 184, a first inclined slot 185 and a second inclined slot 186. A fan-shaped slot 187 is formed at a corner of the substrate 18.

In addition, as shown in FIGS. 1 and 3, the receiving unit 17 is composed of a locking member 171, a receiving bar 172, a positioning bar 173, a restoring bar 174, a tension spring 175, a restoring torsion spring 176 and a pulling spring 177. A rotation center 1711 of the L-shaped locking member 171 and the pulling spring 177 are fixed to the substrate 18 disposed above the slider 153. One end of the locking member 171 is formed with a stopper edge 1712 projecting upward, and is suspended above a moving path of the second guide pin 1423 of the transmission bar 142. The other end of the locking member 171 is formed with a projecting locking pin 1713. One end of the pulling spring 177 is fixed to a periphery of the locking member 171 so that the end of the locking pin 1713 is kept in a state of facing the center of the disk drive device 10. One end of the tension spring 175 is fixed to the end of the stopper edge 1712 of the locking member 171 and substantially penetrates through the rotation center 1711 to reduce the influence on the rotation of the locking member 171. The other end of the tension spring 175 is fixed to the transmission bar 142 so that the transmission bar 142 drives the receiving end of the loading stick 143 and extends toward the front end of the disk drive device 10.

The receiving bar 172 also has an L-shape and is disposed on the substrate 18 and on an opposite side opposite to the locking member 171. A first guiding pin 1722 and a second guiding pin 1723 are disposed on a first extending side 1721 of the receiving bar 172 extending to the center of the disk drive device 10, and are respectively embedded into the first inclined slot 185 and the second inclined slot 186. Thus, the receiving bar 172 slides transversely along the first inclined slot 185 and the second inclined slot 186. When the first guiding pin 1722 penetrates through the first inclined slot 185, the first guiding pin 1722 can just actuate the second sensing switch 192 on the moving path. A small projection 1728 is formed near the front end of the first extending side 1721, and a locking slot 1724 is formed at the distal end of the first extending side 1721. Another vertical extending side 1725 of the receiving bar 172 is parallel to the lateral side of the disk drive device 10, and is formed with a flange 1726 to guide the disc D. A slide fastener 1727 extends around the center of the receiving bar 172. One end of the restoring bar 174 is rotatably mounted on the substrate 18 near the slide fastener 1727. The restoring bar 174 is formed with a moving slot 1741 into which the slide fastener 1727 is embedded. A projecting plate 1742 extends from the lateral side of the restoring bar 174 and penetrates through the fourth arc slot 184. The projecting plate 1742 is pressed by the restoring torsion spring 176 disposed below the substrate 18 so that the height of the device body can be reduced and the receiving bar 172 restores toward the disk drive device 10.

One end of the positioning bar 173 is rotatably mounted on middle rear side of the substrate 18, and the periphery of the positioning bar 173 is formed with a first triggering pin 1731, which projects downward and penetrates through the third arc slot 183 to actuate the third sensing switch 193 disposed nearby. The other end of the positioning bar 173 extends forward to the vicinity of the spindle motor 132. The middle portion of the positioning bar 173 is formed with a branch pin 1732, which projects downward and is embedded into the second arc slot 182 so that the branch pin 1732 can slide in the second arc slot 182 and the supporting intensity of the positioning bar 173 can be enhanced. A restoring pulling spring 1733 is also disposed neighboring to the fixing end of the positioning bar 173, and has one end fixed to the positioning bar 173 and the other end fixed to the substrate 18.

The ejecting unit 16 includes a first link 161, a second link 162 and an ejecting bar 163. The first link 161 and the second link 162 are disposed under the substrate 18, while the ejecting bar 163 is disposed on the substrate 18. The first link 161 has one end rotatably mounted on the bottom side of the substrate 18, and the other end formed with a first driving pin 1611 and a second driving pin 1612, which project downward. The first driving pin 1611 is embedded into the first sliding slot 1533 of the slider 153 and is driven by the slider 153. The second link 162 is transversely disposed on the bottom side of the substrate 18, and has one end connected to the second driving pin 1612 and the other end extending to the bottom of the fan-shaped slot 187 of the substrate 18. A projecting guiding pin 1621 is formed neighboring to the middle of the second link 162 and is embedded into the first arc slot 181 to guide and support the second link 162 to move therewith. A second triggering pin 1622, which projects downward, is formed neighboring to the guiding pin 1621, and can actuate the neighboring second sensing switch 192. One end of the ejecting bar 163 is rotatably mounted on the center of the fan-shaped slot 187, and the periphery of the fixed end is formed with a fixing pin 1631 projecting downward. The fixing pin 1631 penetrates through the fan-shaped slot 187, and is pivotally connected to one end of the second link 162. Thus, the power of the drive unit 15 rotates the ejecting bar 163 through the first link 161 and the second link 162, and the other end of the ejecting bar 163 extends slantingly to the vicinity of the spindle motor 132. A bend 1632 is formed neighboring to the middle portion of the ejecting bar 163.

As shown in FIG. 3, the disk drive device 10 is in a state when no disc is loaded. The slider 153 is located near the backside of the casing 11, makes the fifth sensing switch 195 in an off state and makes the fourth sensing switch 194 in an ON state. Also, the sliding plate 141 is positioned on the backside so that the transmission bar 142 enables the first guide pin 1422 to engage into the first guiding slot 1411 tightly and slidably, and the receiving end of the loading stick 143 to half extend toward the inner side of the disk drive device 10 under the action of the tension spring 175. Meanwhile, the locking member 171 also enables the locking pin 1713 to engage into the locking slot 1724 of the receiving bar 172 under the action of the pulling spring 177, and keeps the receiving bar 172 at the position near the inner side of the disk drive device 10 when the restoring bar 174 is pressed by the restoring torsion spring 176. Also, the first guiding pin 1722 makes the second sensing switch 192 in the ON state. In addition, the positioning bar 173 is pulled by the restoring pulling spring 1733 so that one end of the positioning bar 173 extends forward to the vicinity of the spindle motor 132, and the first triggering pin 1731 thereof actuates the third sensing switch 193 to be in the ON state. The first driving pin 1611 of the first link 161 of the ejecting unit 16 lets the second link 162 make one end of the ejecting bar 163 extend slantingly toward the vicinity of the spindle motor 132, and lets the second triggering pin 1622 of the second link 162 actuate the first sensing switch 191 to be in the ON state under the limitation of the first sliding slot 1533 of the slider 153.

Figure 4:
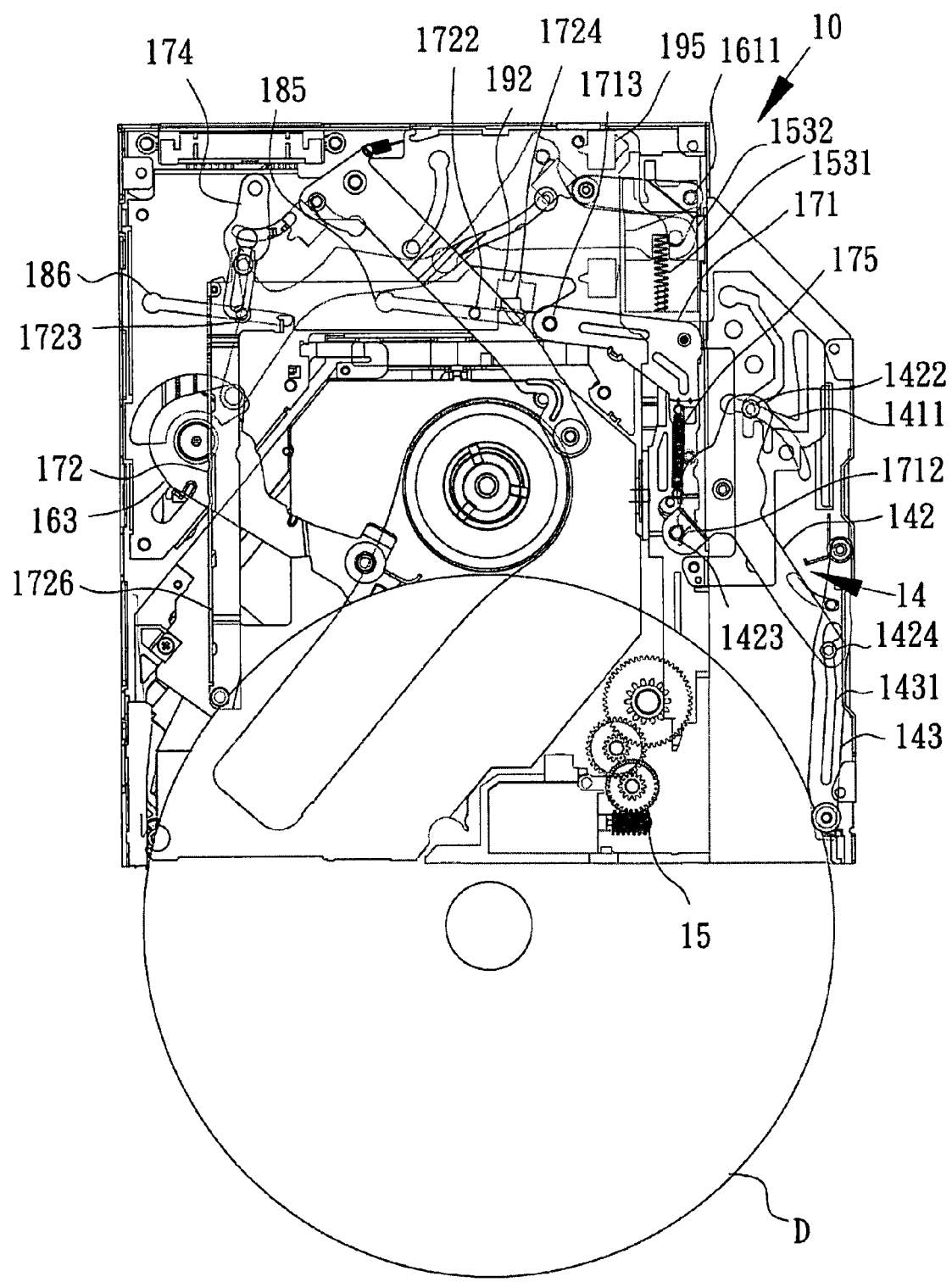
FIG. 4 is a top view showing a large-sized disc, which is loaded into the device of the invention to push a locking member away.

As shown in FIGS. 4 to 7, the disk drive device 10 of the invention drives and guides the large-sized disc D having the diameter of 12 cm, for example, to be loaded and ejected. As shown in FIG. 4, when the large-sized disc D is inserted into the disk drive device 10, one side of the disc D pushes against the lateral side of the disk drive device 10 because the width of the disk drive device 10 is slightly larger than the diameter of the large-sized disc D. The other side of the disk D is pushed by the user to contact the loading unit 14 first, and to push the receiving end of the loading stick 143. Thus, the loading stick 143 is gradually opened laterally to move the longitudinal slot 1431 to actuate the third guide pin 1424 to slide and to bring the transmission bar 142 to resist the rotation of the tension spring 175. As a result, the first guide pin 1422 slides along the first guiding slot 1411, while the second guide pin 1423 is rotated to push the projecting stopper edge 1712 of the locking member 171 so that the locking member 171 resists the rotation of the pulling spring 177 (see FIG. 3) and the locking pin 1713 is moved away from the locking slot 1724 of the receiving bar 172. Then, the projecting flange 1726 of the receiving bar 172 is pushed by the inserted disc D to resist the restoring bar 174, and the first guiding pin 1722 and the second guiding pin 1723 are moved in parallel toward the lateral side of the disk drive device 10 along the first inclined slot 185 and the second inclined slot 186. Meanwhile, the first guiding pin 1722 is moved away from the second sensing switch 192 such that the second sensing switch 192 is in the off state.

Figure 5:
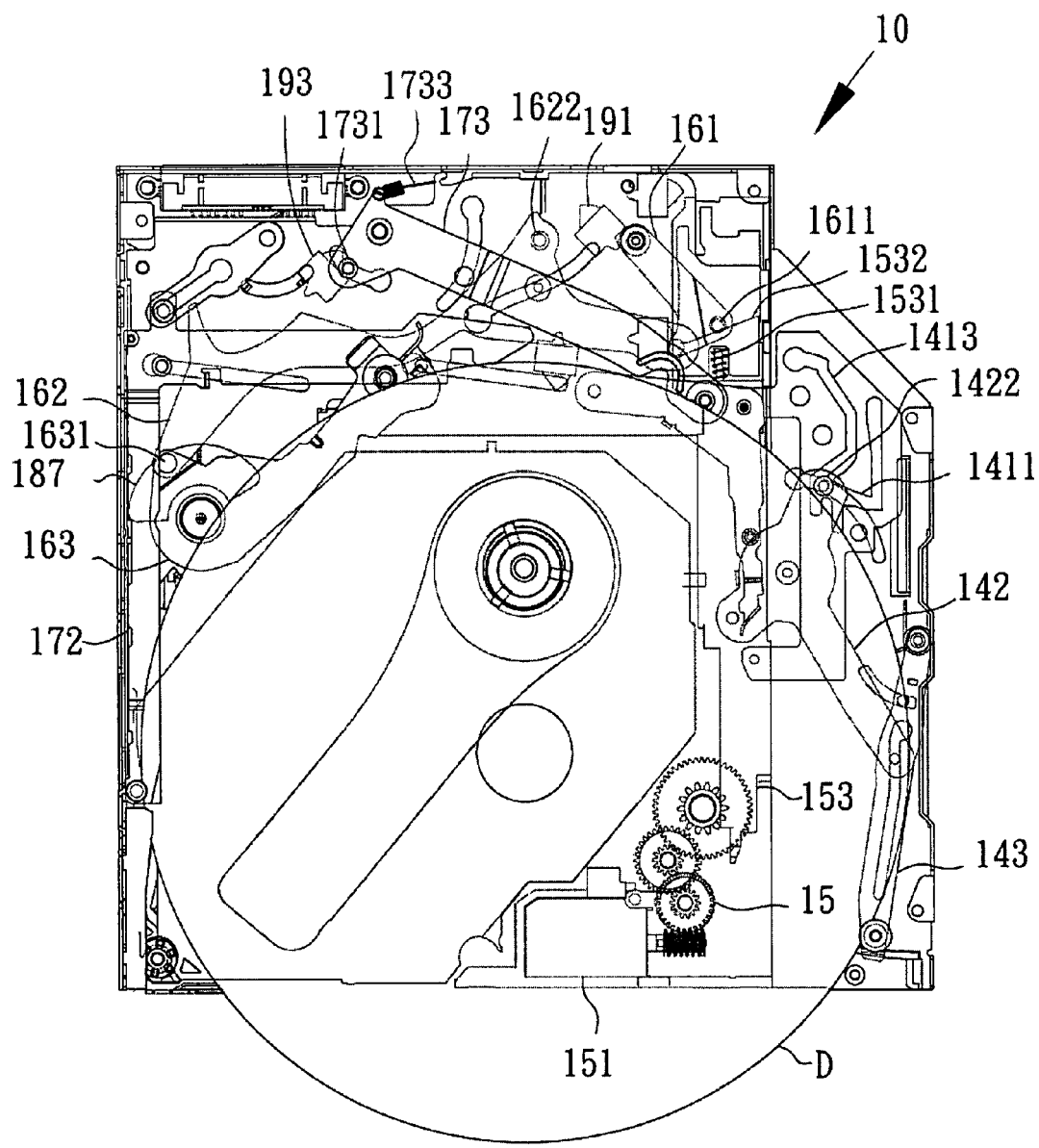
FIG. 5 is a top view showing that a driving motor is enabled to guide the large-sized disc.

When the disc D continues to be inserted, as shown in FIG. 5, the disc D pushes the loading stick 143 to move toward the lateral side and continuously to rotate the transmission bar 142, so that the first guide pin 1422 slides to the third guiding slot 1413 along the first guiding slot 1411. While the receiving bar 172 is pushed by the inserted disc D to gradually move toward the lateral side, portion of the circumference of the disc D in deep inside pushes the much more projected receiving end of the ejecting bar 163 to rotate the ejecting bar 163. The fixing pin 1631 penetrating through the fan-shaped slot 187 moves the second link 162 so that the first driving pin 1611 of the first link 161 pushes the slider 1532 against the ejecting spring 1531 to rotate the first link 161 and thus to move the second link 162 when the slider 153 does not move yet. Thus, the second triggering pin 1622 of the second link 162 is moved away from the first sensing switch 191 such that the first sensing switch 191 is in the off state. When the first sensing switch 191 and the second sensing switch 192 are in the off states, it is determined that the large-sized disc D has been loaded. Next, the disc D pushes back the deeper receiving end of the positioning bar 173 so that the positioning bar 173 resists the pulling force of the restoring pulling spring 1733 and positioning bar 173 is rotated backward, and the first triggering pin 1731 is moved away from the third sensing switch 193 such that the third sensing switch 193 is in the off state. When the first sensing switch 191 and the second sensing switch 192 are in the off states and the third sensing switch 193 is in the off state, it represents that the receiving end of the loading stick 143 has reached the outer circumference of the large-sized disc D, and the disk drive device 10 immediately enables the driving motor 151 to enable the drive unit 15.

Figure 6:
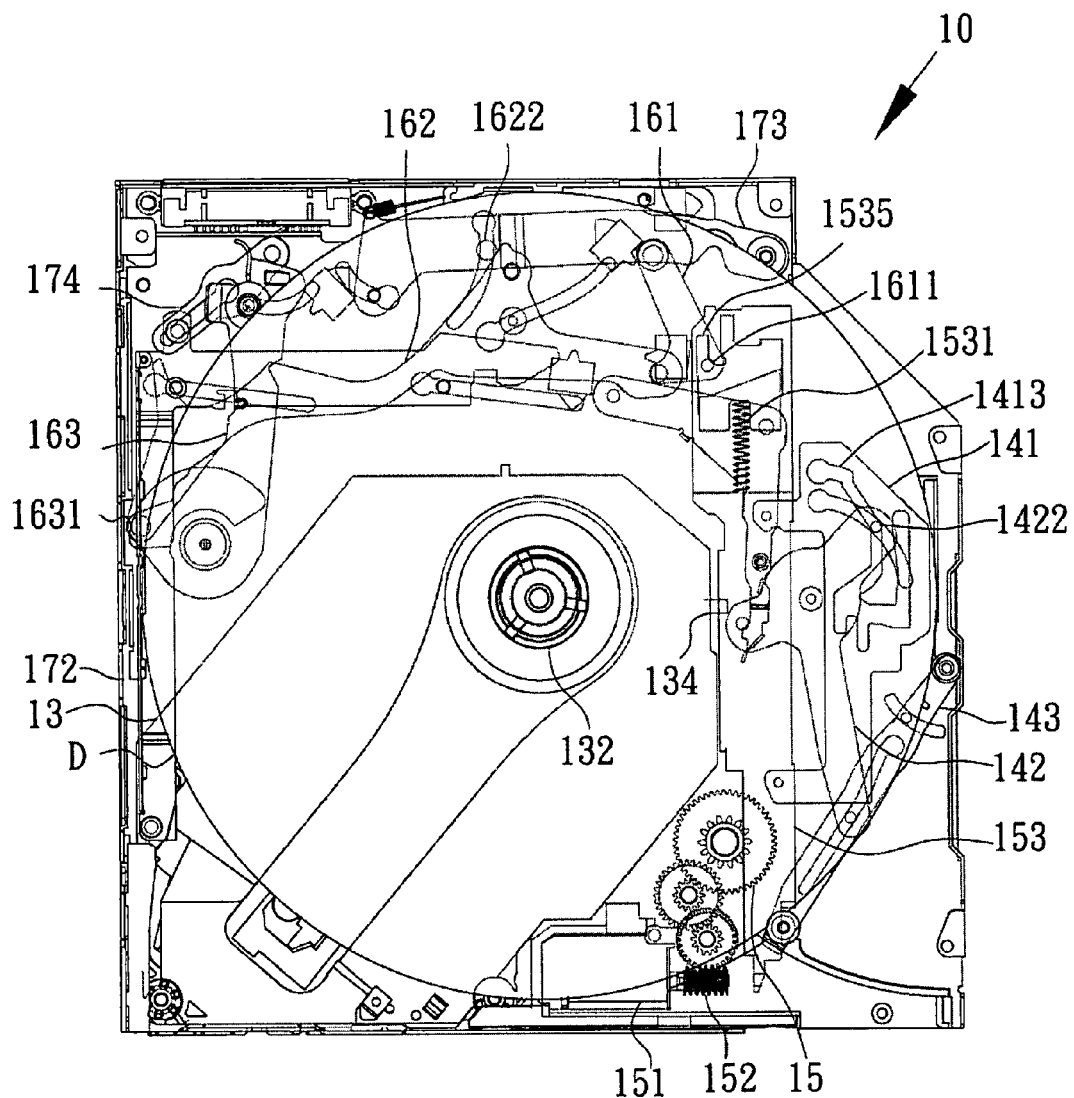
FIG. 6 is a top view showing that the large-sized disc is guided and then positioned according to the invention.

As shown in FIG. 6, after the drive unit 15 is enabled, the driving motor 151 rotates the gear set 152 to move the slider 153 forward. Also, the sliding plate 141 moves forward therewith, the first guide pin 1422 of the transmission bar 142 slides into the third guiding slot 1413 and slides along the third guiding slot 1413, the transmission bar 142 is rotated to drive the loading stick 143 to push the disc D into the device, and the receiving ends of the ejecting bar 163 and the positioning bar 173 are continuously pushed backward. Meanwhile, the rotation of the ejecting bar 163 moves the first driving pin 1611 of the first link 161 toward the third sliding slot 1535, and the forward movement of the slider 153 makes the first link 161 of the first driving pin 1611 release the ejecting spring 1531. When the disc D is aligned with the spindle motor 132, the sliding pin 134 of the traverse 13 rises with the lifting slot 1537 of the slider 153 (see FIG. 3) so that the spindle motor 132 clamps the disc D.

Figure 7:
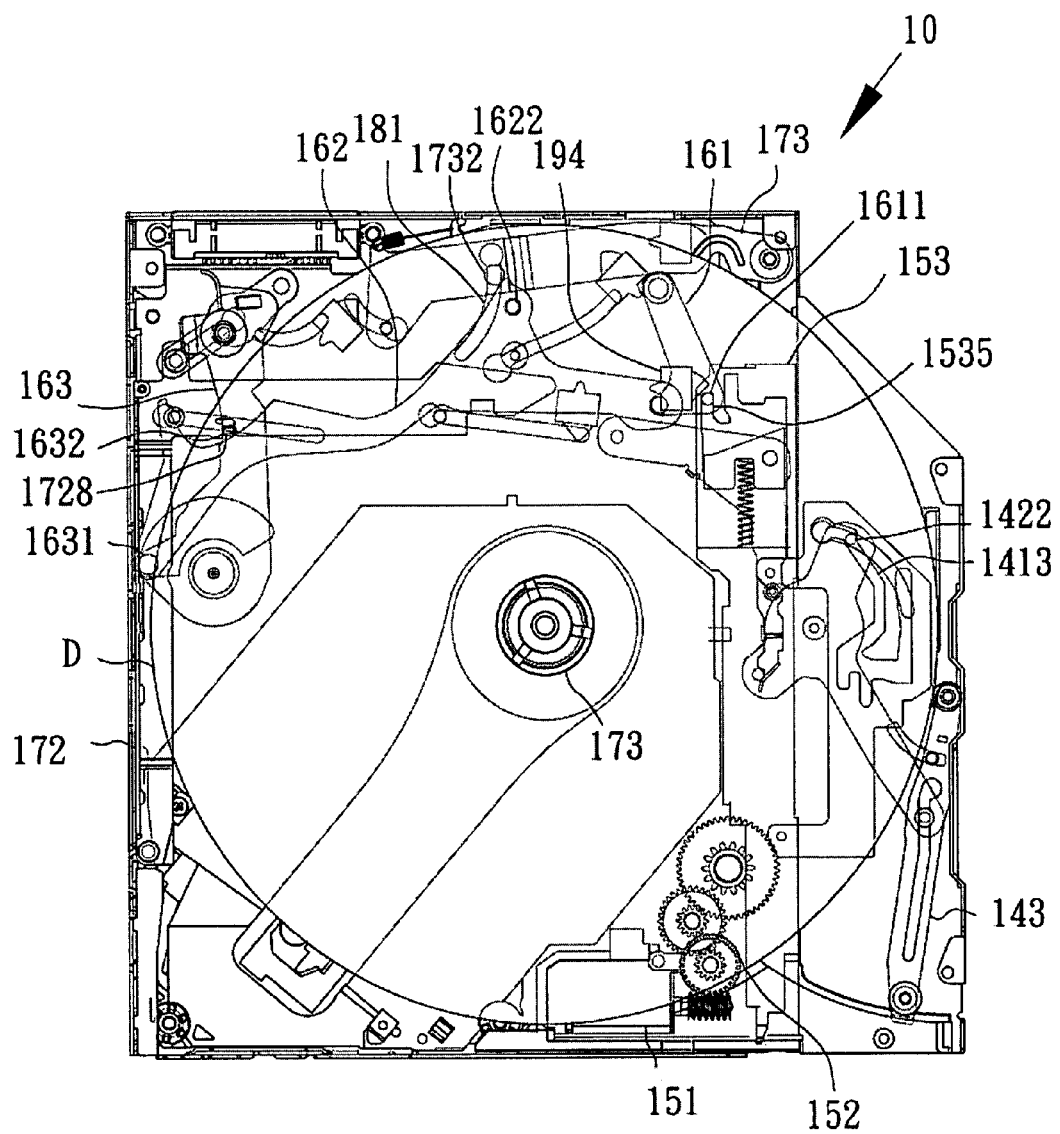
FIG. 7 is a top view showing that a guiding member is separated from the large-sized disc according to the invention.

As shown in FIG. 7, when the slider 153 continues to move forward until the rear end of the slider 153 is moved away from the fourth sensing switch 194 such that the fourth sensing switch 194 is in the off state, the driving motor 151 stops rotating and the slider 153 is stopped. At this time, the loading stick 143, which is influenced by the sliding position of the first guide pin 1422 along the third guiding slot 1413, moves the receiving end of the loading stick 143 away from the circumference of the disc D. The first driving pin 1611 of the first link 161 enters the third sliding slot 1535 so that the ejecting unit 16 further moves therewith, the receiving end of the ejecting bar 163 is away from the circumference of the disc D, and the bend 1632 of the ejecting bar 163 also pushes the projection 1728 of the receiving bar 172 to move toward the lateral side again and to leave the circumference of the disc D. Meanwhile, the outer periphery of the second link 162 neighboring to the second triggering pin 1622 also pushes the branch pin 1732 to slide again along the second arc slot 182. Therefore, the positioning bar 173 is away from the circumference of the disc D and cannot contact the disc D so that the spindle motor 132 is enabled to rotate the disc D.

When the ejecting button 122 is pressed (see FIG. 1), the motor 151 is enabled to reverse the gear set 152 to push the slider 153 backward. The slider 153 reverses the first link 161 and the second link 162 reverses the ejecting bar 163 so that the receiving end of the ejecting bar 163 pushes the disc D out and the power source for ejecting the disc is provided. Meanwhile, the disk drive device 10 ejects the disc according to an reversing order of the operation mentioned hereinabove. That is, as shown in FIG. 6, the ejecting bar 163 reverses to let the receiving end contact the circumference of the disc D, while the fixing pin 1631 of the ejecting bar 163 releases the receiving bar 172 so that the receiving bar 172 presses the rear circumference of the disc D when the restoring torsion spring 176 presses the restoring bar 174. Also, the second link 162 releases the second triggering pin 1622 so that the positioning bar 173 contacts the circumference of the disc D. The loading stick 143 is influenced by the sliding position of the first guide pin 1422 along the third guiding slot 1413 so that the receiving end of the loading stick 143 contacts the circumference of the disc D. Next, the traverse 13 lowers down with the backward movement of the slider 153 so that the spindle motor 132 is separated from the disc D.

Figure 8:
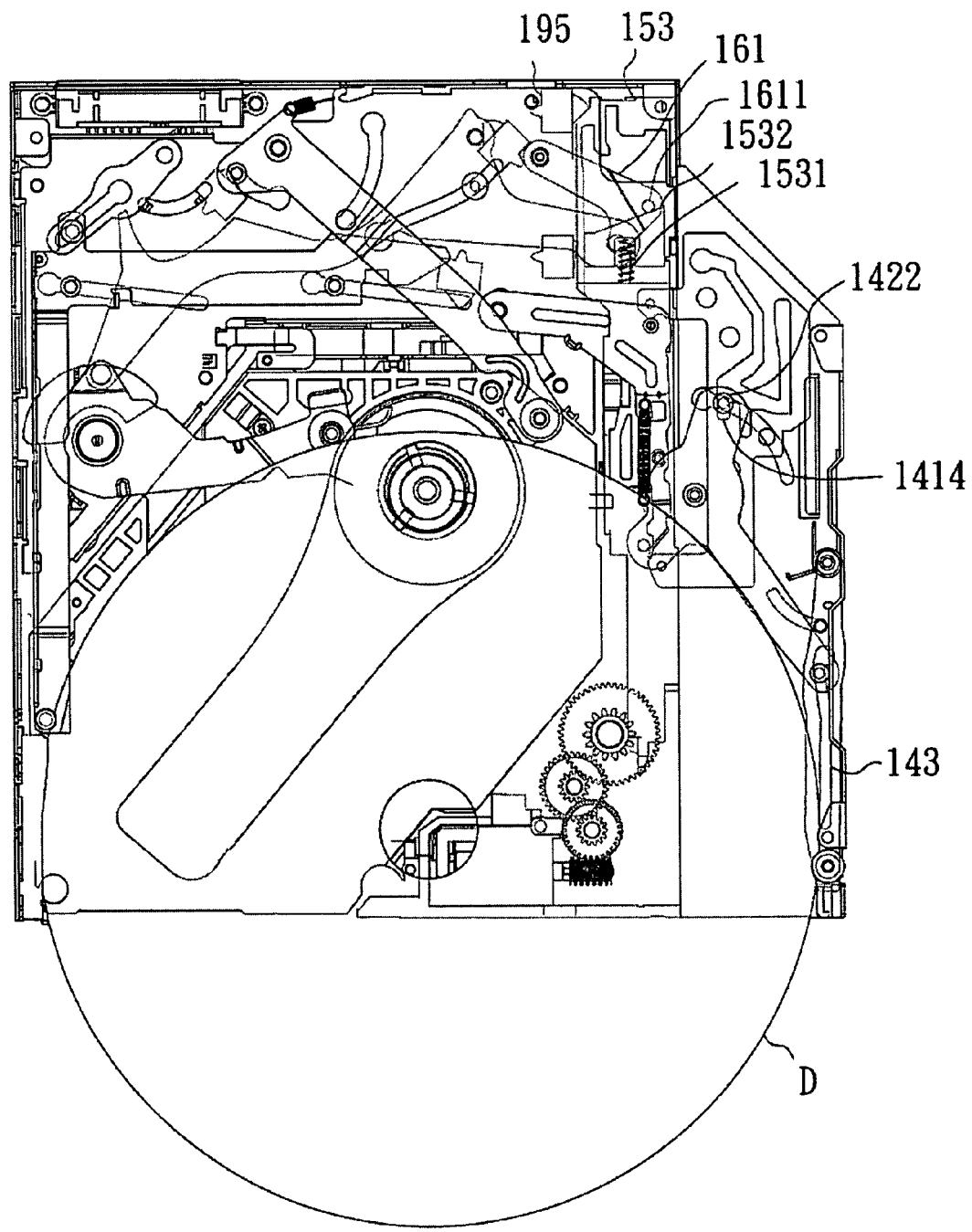
FIG. 8 is a top view showing that the large-sized disc is guided and then ejected according to the invention.

When the reversing ejecting bar 163 continues to push the disc D out, as shown in FIG. 5, the positioning bar 173 gradually restores under the action of the restoring pulling spring 1733, while the first guide pin 1422 slides out of the third guiding slot 1413 and enters the first guiding slot 1411. As shown in FIG. 8, the slider 153 continues to move backward, and the first driving pin 1611 of the first link 161 presses the slider 1532 to compress the ejecting spring 1531 until the rear end actuates the fifth sensing switch 195. Thus, the first guide pin 1422 enters the fourth guiding slot 1414 to move the loading stick 143 completely alongside so as not to block the ejecting of the disc D. As shown in FIG. 4, as soon as the fifth sensing switch 195 is in the ON state, the power of the drive unit 15 is immediately cut off, and the resilience of the compressed ejecting spring 1531 pushes the first driving pin 1611 to force the ejecting bar 163 to push the disc D out again and to force the slider 153 to move forward slightly and leave the fifth sensing switch 195 such that the fifth sensing switch 195 is in the off state, and the first guide pin 1422 is moved back to the first guiding slot 1411. As shown in FIG. 3, when the disc D is moved away from the disk drive device 10, the receiving bar 172 slides back to the inner side of the disk drive device 10 when the restoring torsion spring 176 presses the restoring bar 174 so that the locking slot 1724 engages with the locking pin 1713 and the initial state is recovered.

Figure 9:
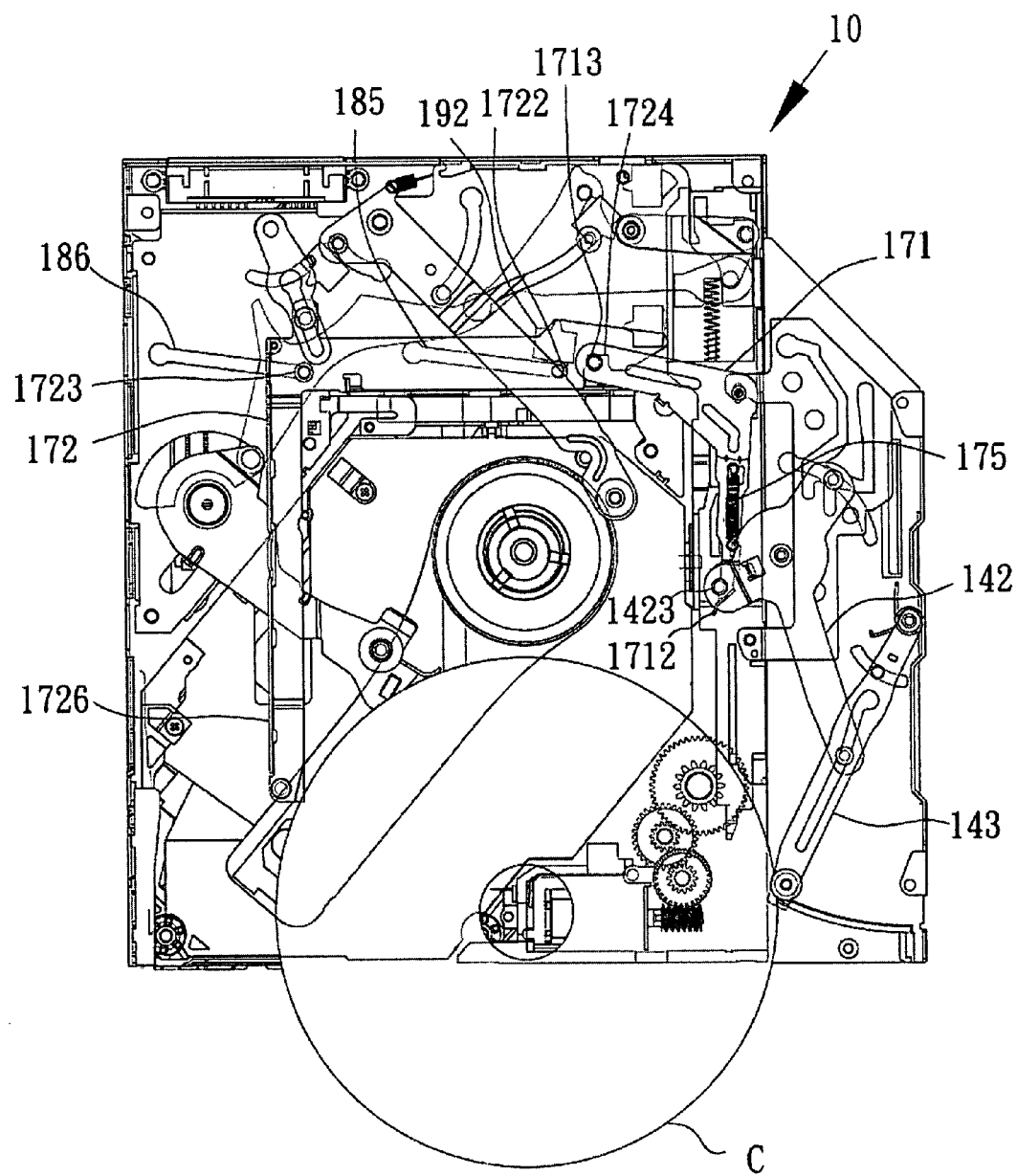
FIG. 9 is a top view showing that a small-sized disc of the invention is loaded.

As shown in FIGS. 9 to 13, the disk drive device 10 of the invention drives and guides the small-sized disc C having the diameter of 8 cm, for example, to be loaded and ejected. As shown in FIG. 9, when the disc C is inserted into the disk drive device 10, one side of the disc C moves along the flange 1726 of the receiving bar 172 and enters the disk drive device 10. Because the width from the flange 1726 to the loading stick 143 is slightly smaller than the diameter of the disc C, the disc C is pushed to push the receiving end of the loading stick 143 slightly toward the lateral side and to rotate the transmission bar 142 by a small angle. In this case, the second guide pin 1423 cannot touch the stopper edge 1712 and the locking member 171 cannot be rotated so that the locking pin 1713 is still locked in the locking slot 1724. As a result, the first guiding pin 1722 and the second guiding pin 1723 of the receiving bar 172 cannot slide along the first inclined slot 185 and the second inclined slot 186, while the first guiding pin 1722 cannot leave the first sensing switch 191 and is thus kept on the ON state continuously.

Figure 10:
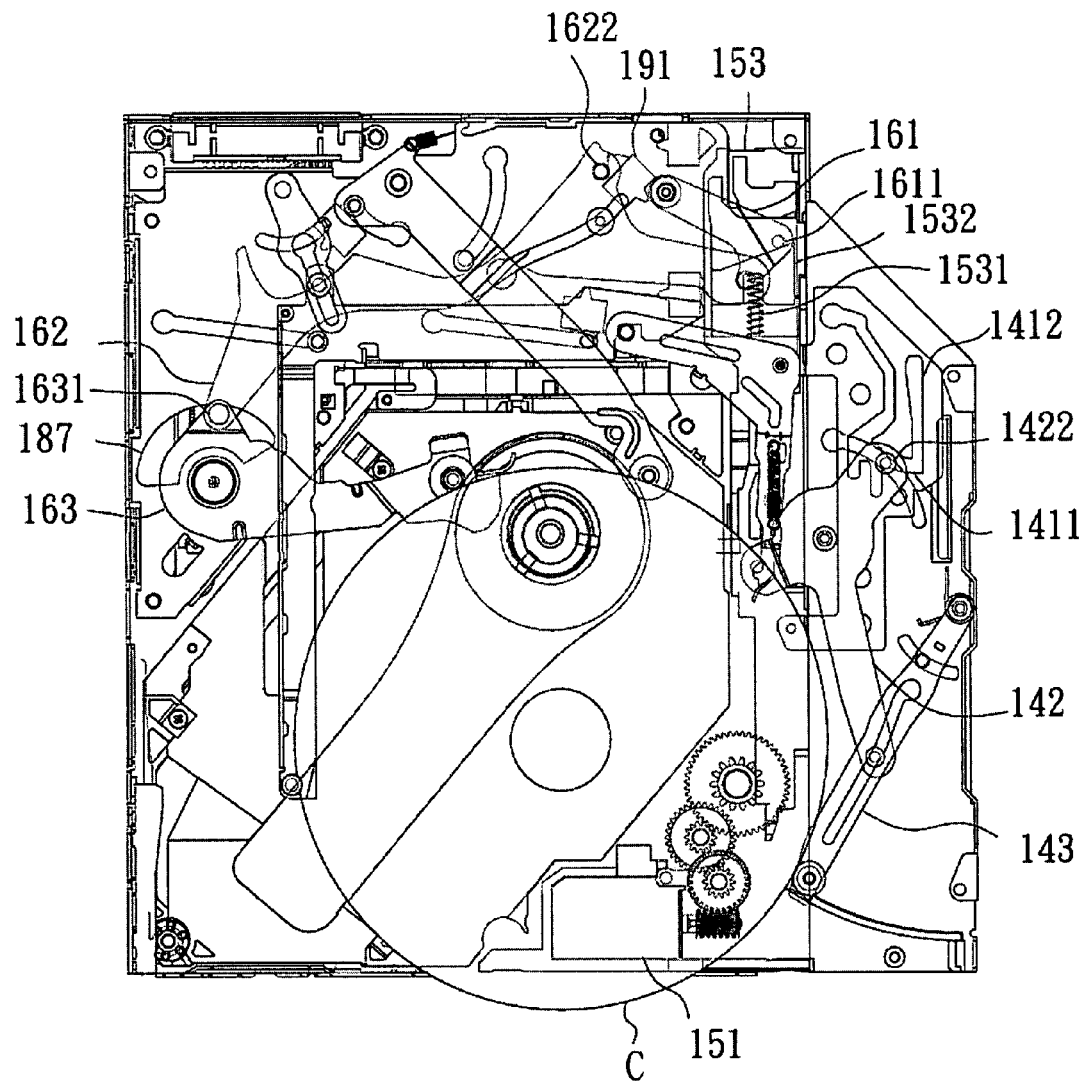
FIG. 10 is a top view showing that the driving motor is enabled to guide the small-sized disc according to the invention.

When the disc C continues to be inserted, as shown in FIG. 10, the loading stick 143 reaches the outer circumference of the disc C and is moved toward the inner side to rotate the transmission bar 142 so that the first guide pin 1422 slides to the second guiding slot 1412 along the first guiding slot 1411. The deep inside of the circumference of the disc C first pushes the much more projected receiving end of the ejecting bar 163 to move backward so that the ejecting bar 163 is rotated. The fixing pin 1631 penetrates through the fan-shaped slot 187, and the second link 162 is moved so that the first driving pin 1611 of the first link 161 pushes the slider 1532 against the ejecting spring 1531 when the slider 153 is not started. Thus, the first link 161 is rotated to move the second link 162 so that the second triggering pin 1622 thereon is separated from the first sensing switch 191, such that the first sensing switch 191 is in the off state. When the second sensing switch 192 is in the ON state, it is determined that the small-sized disc C is loaded, and the driving motor 151 is enabled simultaneously.

Figure 11:
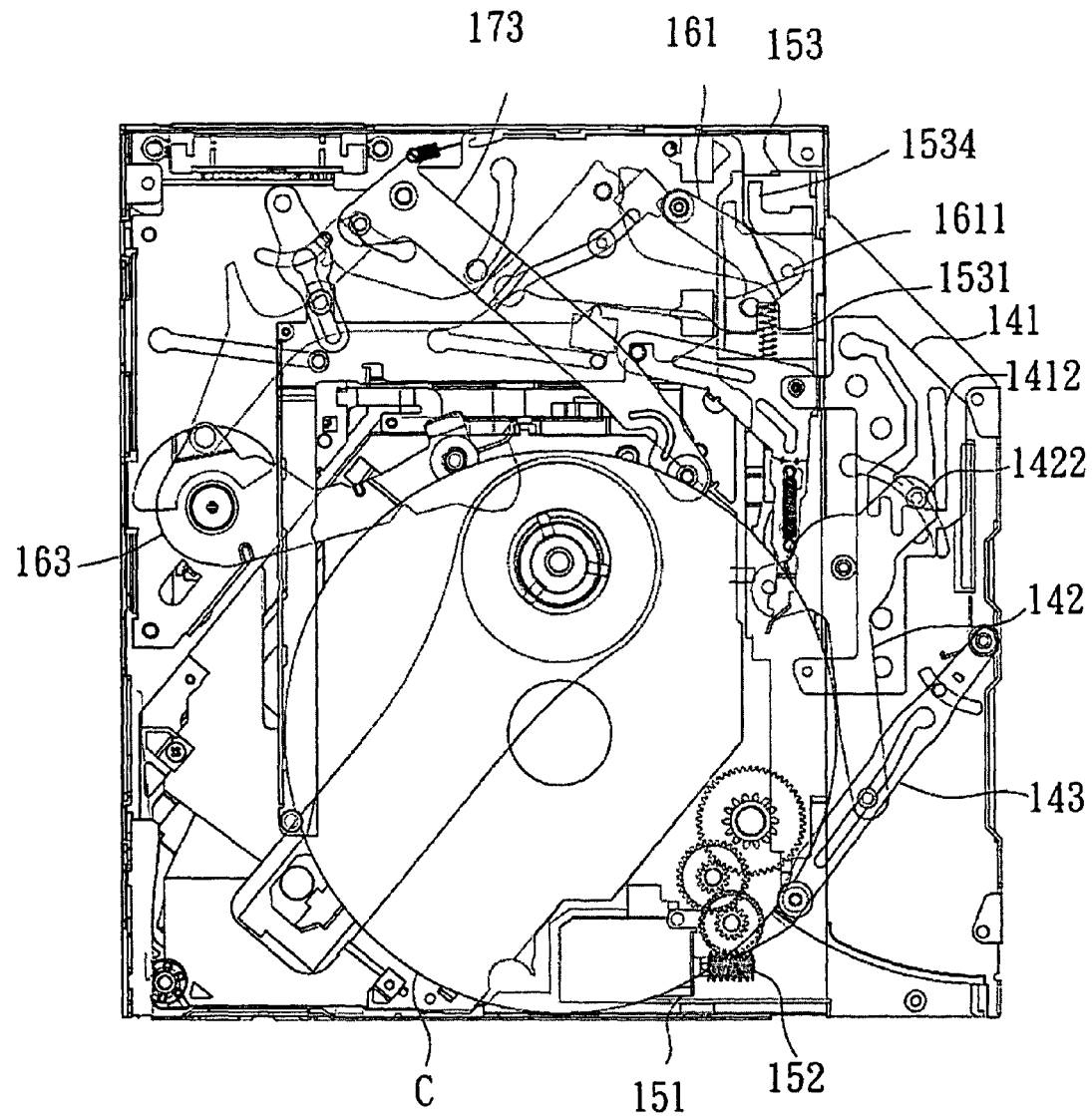
FIG. 11 is a top view showing that the small-sized disc is driven and then loaded according to the invention.
Figure 12:
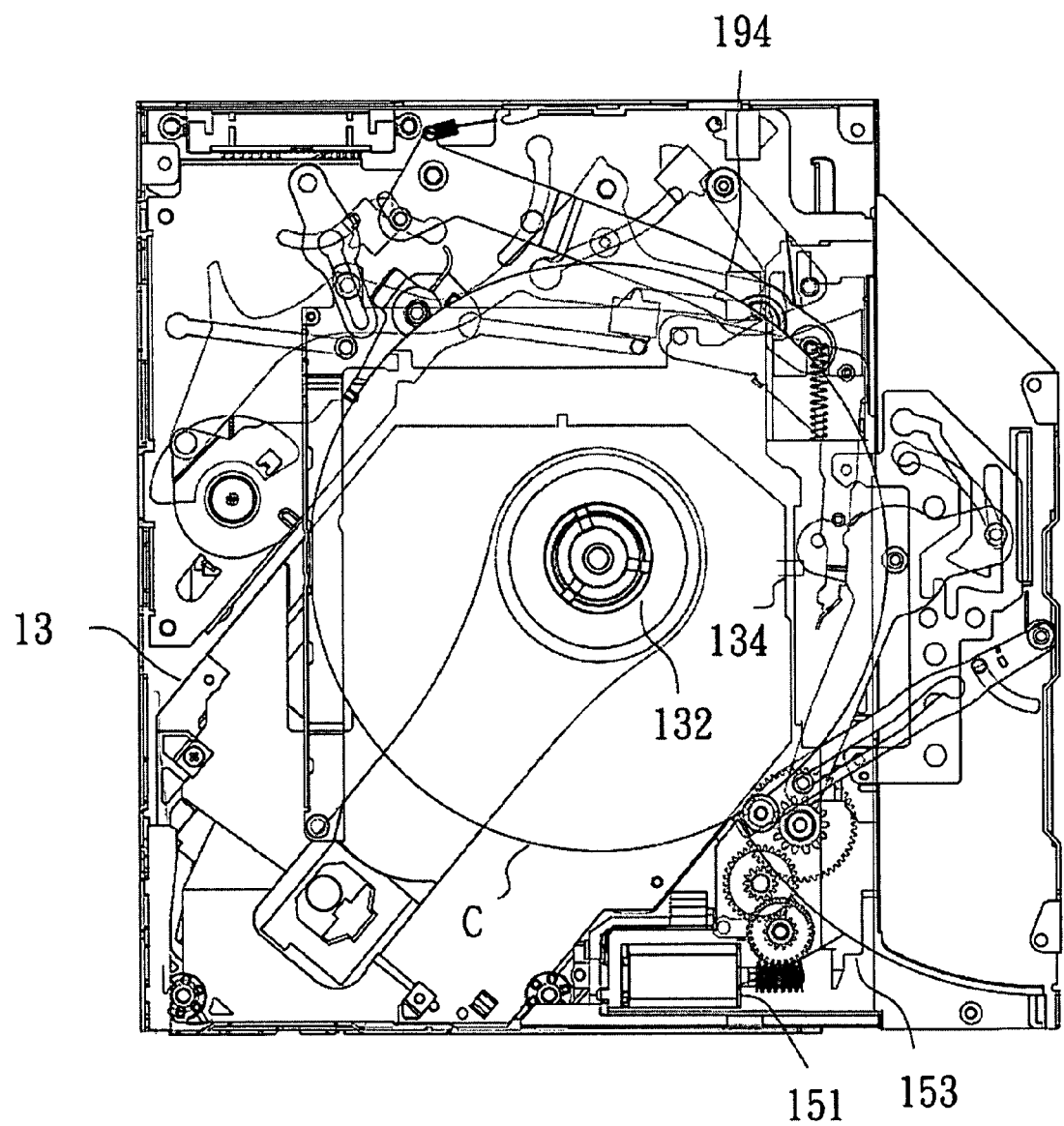
FIG. 12 is a top view showing that the small-sized disc is guided and then positioned according to the invention.

As shown in FIG. 11, after the driving motor 151 is enabled, the driving motor 151 rotates the gear set 152 to move the slider 153 forward so that the sliding plate 141 moves forward therewith and the first guide pin 1422 of the transmission bar 142 slides toward the second guiding slot 1412. The transmission bar 142 is rotated to drive the loading stick 143 to push the disc C into the device, and continues to push the receiving ends of the ejecting bar 163 and the positioning bar 173 backward. Meanwhile, the rotation of the ejecting bar 163 moves the first driving pin 1611 of the first link 161 toward the second sliding slot 1534, and the forward movement of the slider 153 also causes the first driving pin 1611 of the first link 161 to release the ejecting spring 1531. As shown in FIG. 12, when the disc C is aligned with the spindle motor 132, the sliding pin 134 of the traverse 13 rises with the lifting slot 1537 of the slider 153 (see FIG. 3) so that the spindle motor 132 clamps the disc C.

Figure 13:
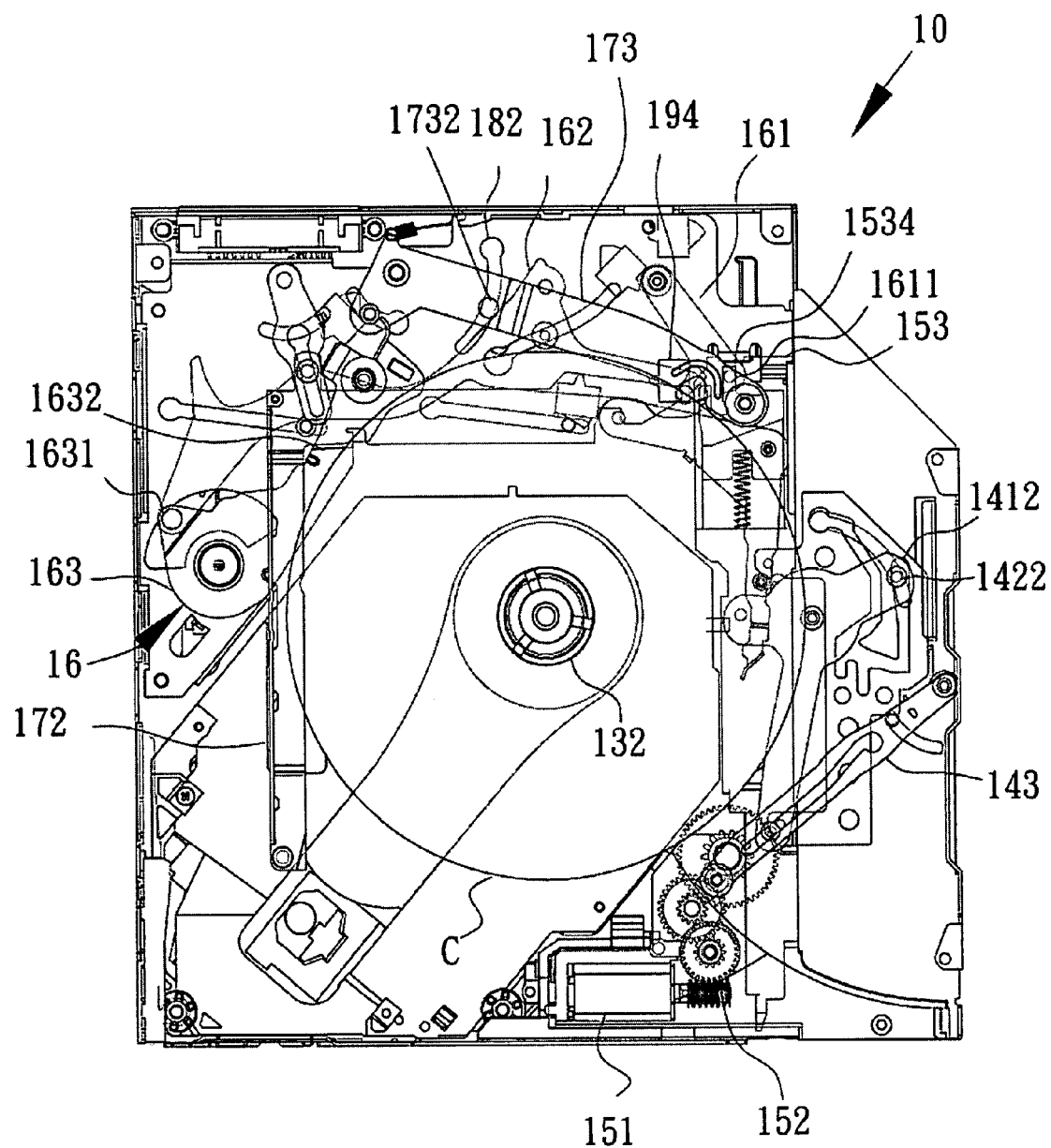
FIG. 13 is a top view showing that the guiding member is separated from the small-sized disc according to the invention.

As shown in FIG. 13, when the slider 153 continues to move forward until the rear end of the slider 153 is separated from the fourth sensing switch 194 such that the fourth sensing switch 194 is in the off state, the motor 151 stops rotating and the slider 153 is stopped. At this time, the loading stick 143, which is influenced by the sliding position of the first guide pin 1422 along the second guiding slot 1412, moves the receiving end of the loading stick 143 away from the circumference of the disc C. The first driving pin 1611 of the first link 161 enters the second sliding slot 1534 so that the ejecting unit 16 further moves therewith, the receiving end of the ejecting bar 163 is away from the circumference of the disc C, and the bend 1632 of the ejecting bar 163 also pushes the bend of the receiving bar 172 to move toward the lateral side again and to leave the circumference of the disc C. Meanwhile, the outer periphery of the second link 162 pushes the branch pin 1732 to slide along the second arc slot 182 so that the positioning bar 173 leaves the circumference of the disc C and cannot contact the disc C, and the spindle motor 132 is enabled to rotate the disc C.

Figure 14:
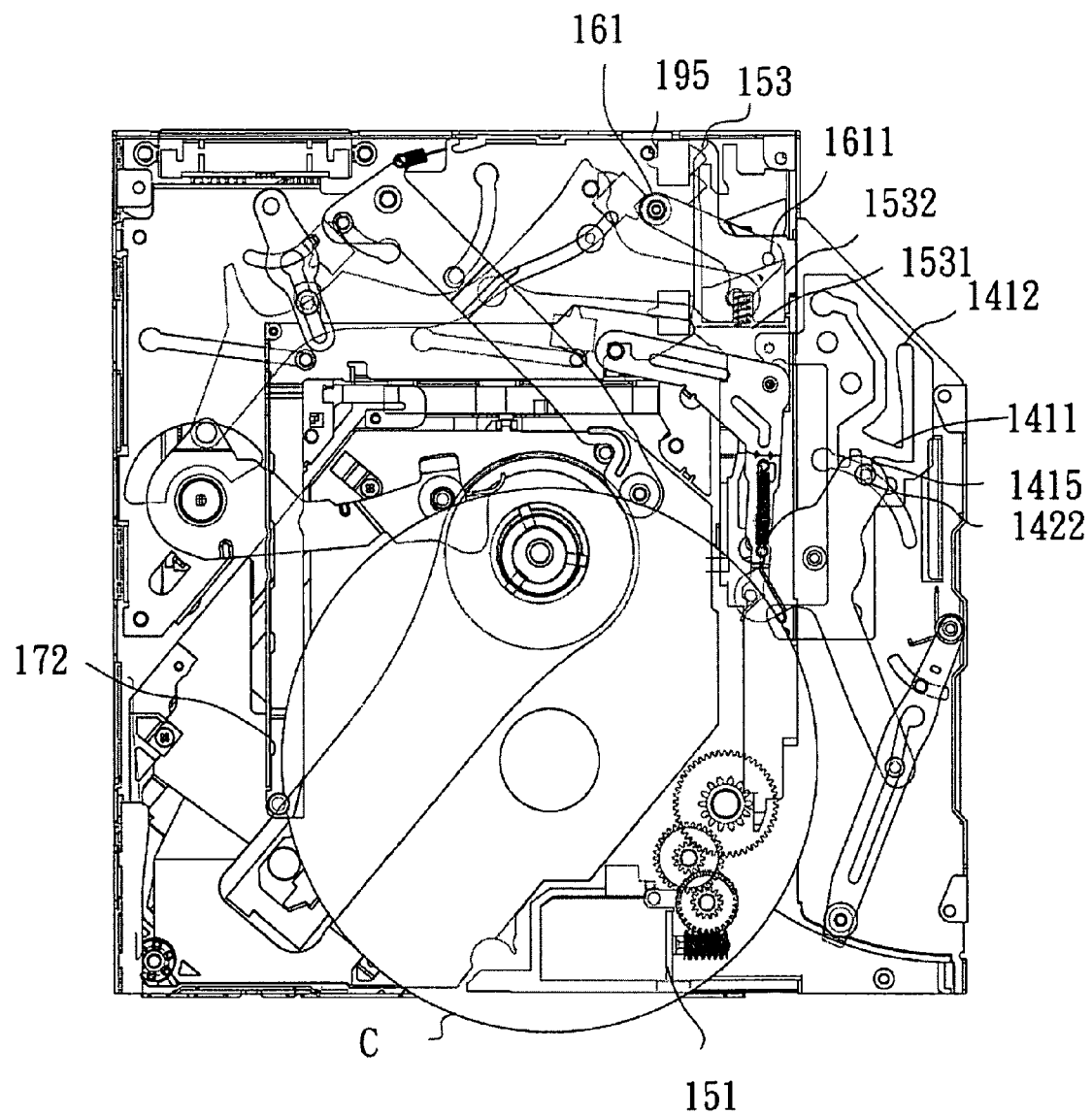
FIG. 14 is a top view showing that the small-sized disc is guided and ejected according to the invention.

When the ejecting button 122 is pressed (see FIG. 1), the motor 151 is enabled to reverse the gear set 152 to push the slider 153 backward. The slider 153 reverses the first link 161 and the second link 162 reverses the ejecting bar 163 so that the receiving end of the ejecting bar 163 pushes the disc C out and the power source for ejecting the disc is provided. Meanwhile, the disk drive device 10 ejects the disc according to the reversing order of the operation mentioned hereinabove. When the reversed ejecting bar 163 continues to push the disc C out, as shown in FIG. 14, the first guide pin 1422 slides out of the second guiding slot 1412 and enters the first guiding slot 1411. The slider 153 continues to move backward, and the first driving pin 1611 of the first link 161 presses the slider 1532 to compress the ejecting spring 1531 until the rear end actuates the fifth sensing switch 195. Thus, the first guide pin 1422 enters the fifth guiding slot 1415 and moves the loading stick 143 to the lateral side so as not to block the ejecting of the disc C.

Thus, the loading stick is rotated by different angles when the different sizes of discs are loaded in the disk drive device of the invention. Then, the transmission bar is driven to rotate the locking member so as to unlock or lock the receiving bar. Thus, the size of the disc can be mechanically determined, and the projecting flange of the receiving bar may be fixed at different positions for guiding the discs of, different sizes, and the discs of different sizes can be precisely and stably positioned along the flange so that the disc jam is avoided and the fault rate is reduced. In addition, the slider slides back and forth to move the ejecting unit of a link transmission mechanism. Thus, the sufficient driving force for ejecting the disc can be transmitted, and the disc may be guided and positioned when the disc is loaded. Also, the link may be utilized to actuate the sensing switch to provide a secondary reference for determining the disc. Meanwhile, the positioning bar is pushed away from the circumference of the disc when the positioning is finished so as no to block the rotation of the disc. Thus, one bar may have multiple functions so that the structure is simplified and the cost is reduced. In addition, the extending guiding slot is formed on the sliding plate according to the size of the disc in the invention. Thus, when the disc is ejected, the loading stick is kept alongside and away from the ejecting path so that the disc can be ejected more smoothly.

Figure 15:
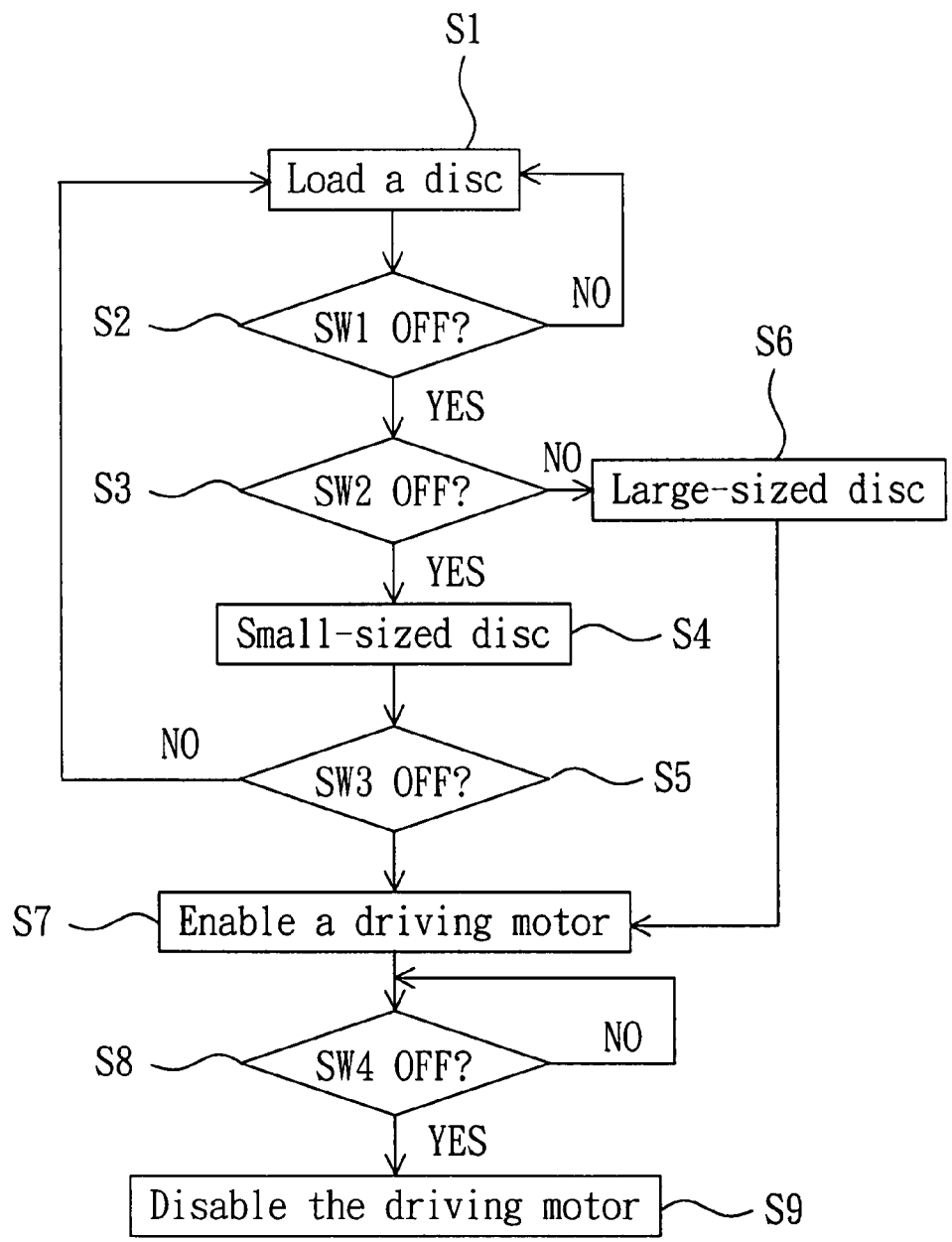
FIG. 15 is a flow chart showing a method of driving a disc according to the invention.

Referring to FIG. 15, the disk drive method of the invention includes the following steps.

In step S1, the disc is inserted into the disk drive device 10, and the disc loading operation is enabled.

In step S2, it is detected whether the first sensing switch 191 (SW1) is in the OFF state. That is, it is detected whether the ejecting unit 16 is pushed by the disc. If the first sensing switch 191 (SW1) is changed from the ON state to the OFF state, the next step has to be performed. If the first sensing switch 191 (SW1) is kept on the ON state, it represents that the disc is not continuously loaded, and the procedure goes back to step S1 to continue the disc loading.

In step S3, it is detected whether the second sensing switch 192 (SW2) is in the OFF state. It is detected whether the receiving bar 172 is separated from the locking member 171 and whether the receiving bar 172 is moved according to the mechanical determination of disk size. If the second sensing switch 192 (SW2) is changed from the ON state to the OFF state, the next step is performed. If the second sensing switch 192 (SW2) is kept in the ON state, the procedure goes to step S6.

In step S4, when the second sensing switch 192 (SW2) is changed from the ON state to the OFF state and the first sensing switch 191 (SW1) is in the ON state, it is determined that the large-sized disc D is loaded.

In step S5, it is detected whether the third sensing switch 193 (SW3) is in the OFF state. If the third sensing switch 193 (SW3) is changed from the ON state to the OFF state, it represents that over a half portion of the large-sized disc D has been loaded and the procedure may enter step S7. If the third sensing switch 193 (SW3) is still kept in the ON state, it represents that the disc is not sufficiently loaded, and the procedure goes back to step S1 to continue the disk loading process.

In step S6, if the second sensing switch 192 (SW2) is kept in the ON state, it is determined that the large-sized disc D is loaded.

In step S7, when the disc is loaded by a suitable distance, the driving motor 151 is enabled so that the drive unit 15 drives the loading unit 14, the receiving unit 17 and the ejecting unit 16 and the disc is guided and then positioned.

In step S8, it is detected whether the fourth sensing switch 194 (SW4) is in the OFF state. If the fourth sensing switch 194 (SW4) is changed from the ON state to the OFF state, it represents that the drive unit 15 has moved to the position where the disc has been positioned, and the procedure may enter step S9. If the fourth sensing switch 194 (SW4) is in the ON state, it represents that the disc has not been positioned yet, and the procedure continues to detect whether the fourth sensing switch 194 (SW4) is in the OFF state.

In step S9, the driving motor 151 is disabled, and the disc loading procedure ends.

According to the disc loading step, the drive unit 15 drives the loading unit 14, the receiving unit 17 and the ejecting unit 16 in the disk drive method of the invention. Also, the sensing unit 19 is provided, and the moving properties of the different sizes of discs are utilized. Thus, the order of actuating the sensing unit 19 is selected when the receiving unit 17 and the ejecting unit 16 are moved so that the size of the disc may be determined according to the mechanical determining mechanism. Consequently, the structure is simple, the cost is low and the reliability of determining the disc size can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in disk drive device, comprising:
   a drive unit for providing power to move a slider formed with a sliding slot;
   a loading unit, moving with the slider, for providing a pushing force for a loading stick to push a disc into the device;
   an ejecting unit, which is a bar-linkage mechanism and has one end driven by the sliding slot and the other end rotating an ejecting bar to guide the disc or to push the disc out;
   a receiving unit, which has a receiving bar and a positioning bar, and is actuated by the loading unit to guide the disc, wherein the positioning bar is disposed between the loading unit and the ejecting unit; and
   a sensing unit comprising a plurality of sensing switches, which comprises a first sensing switch, a second sensing switch and a third sensing switch, wherein the first sensing switch is disposed near a moving path of the ejecting unit, the second sensing switch is disposed near a moving path of the receiving bar, and the third sensing switch is disposed near a moving path of the positioning bar,
   wherein the sensing unit further comprises a fourth sensing switch and a fifth sensing switch, which are attached to a rear lateral side of the slider and respectively sense end points of disc during loading and ejecting.

2. The device according to claim 1, wherein the drive unit comprises:
   a driving motor for providing the power;
   a gear set driven by the driving motor;
   the slider driven by the gear set to slide back and forth.

3. The device according to claim 1, wherein the slider is further fixed to an ejecting spring, one end of the ejecting spring presses against a slidable ejecting slider, and the ejecting slider and a rear-end wall of the slider form the sliding slot.

4. The device according to claim 3, wherein the sliding slot comprises a transversal first sliding slot, and both a second sliding slot and a third sliding slot extending backward.

5. The device according to claim 1, wherein the loading unit comprises:
   a sliding plate having one side fixed to the slider, wherein a first guiding slot is formed on the sliding plate and connects both a second guiding slot and a third guiding slot extending backward, and connects both a fourth guiding slot and a fifth guiding slot extending forward;
   a transmission bar having a first end formed with a projecting first guide pin embedded into the first guiding slot, a second end formed with a projecting second guide pin suspended above the slider, and a third end fixed to a third guide pin projecting downward; and
   a loading stick, which has one end fixed and is formed with a longitudinal slot in an axial direction, wherein the third guide pin is embedded into the longitudinal slot.

6. The device according to claim 1, wherein the sensing switches are limit switches.

7. The device according to claim 1, further comprising a substrate spread over a rear upper side of the disk drive device.

8. The device according to claim 7, wherein the substrate is formed with a first inclined slot and a second inclined slot, both of which are in parallel with each other.

9. The device according to claim 8, wherein the receiving bar has a first extending side and extends toward a center of the disk drive device, a first guiding pin and a second guiding pin disposed on the first extending side are respectively embedded into the first inclined slot and the second inclined slot to slide in the first inclined slot and the second inclined slot, and a distal end of the first extending side is formed with a concave locking slot.

10. The device according to claim 9, wherein the receiving unit further comprises a locking member and a pulling spring, the locking member is fixed on the substrate and has one end formed with a stopper edge projecting upward and suspended above the moving path of a transmission bar, and the other end of the locking member is formed with a projecting locking pin, wherein the pulling spring forces the locking pin to engage into the locking slot.

11. The device according to claim 9, wherein when the first guiding pin penetrates through the first inclined slot, the second sensing switch on the moving path is actuated.

12. The device according to claim 9, wherein the first extending side formed with a small projection.

13. The device according to claim 9, wherein the receiving bar has a second extending side in parallel with a lateral side of the disk drive device, and is formed with a flange.

14. The device according to claim 9, wherein the receiving unit further comprises a restoring bar having one end rotatably mounted on the substrate and formed with a moving slot, a slide fastener extending from the receiving bar is embedded into the moving slot, and a restoring torsion spring supports and restores the receiving bar.

15. The device according to claim 7, wherein the substrate is separately formed with a first arc slot, a second arc slot, a third arc slot, a fourth arc slot and a fan-shaped slot.

16. The device according to claim 15, wherein one end of the positioning bar is rotatably mounted on the substrate and is formed with a first triggering pin penetrating through the third arc slot to actuate the third sensing switch, a restoring pulling spring is disposed neighboring to a fixed end of the positioning bar to restore the positioning bar, and the other end of the positioning bar extends forward.

17. The device according to claim 15, wherein the ejecting unit further comprises:
- a first link having one end rotatably mounted on the substrate, and the other end formed with a first driving pin, which projects downward and is embedded into the sliding slot of the slider;
- a second link having one end connected to the first link; and
- the ejecting bar having one end rotatably mounted on the substrate and is pivotally connected to the other end of the second link.

18. The device according to claim 17, wherein the ejecting bar is located at center of the fan-shaped slot.

19. The device according to claim 17, wherein the ejecting bar is disposed on top side of the substrate, and the first link and the second link are disposed on bottom side of the substrate.

20. The device according to claim 17, wherein a guiding pin is disposed neighboring to middle of the second link and is embedded into the first arc slot.

21. The device according to claim 17, wherein the second link is further formed with a second triggering pin for actuating the first sensing switch.

22. The device according to claim 17, wherein the other end of the ejecting bar extends toward center of the disk drive device slantingly, and a bend is formed neighboring to middle portion of the ejecting bar.

* * * * *